US012311354B2

(12) United States Patent
Mintchev et al.

(10) Patent No.: US 12,311,354 B2
(45) Date of Patent: May 27, 2025

(54) ATTACHMENT DEVICE FOR FLUID DISPENSING ASSEMBLIES

(71) Applicant: FREDsense Technologies Corp., Calgary (CA)

(72) Inventors: Paul Mintchev, Calgary (CA); Cheng Chen, Calgary (CA); Lisa Oberding, Calgary (CA); Robert Mayall, Calgary (CA); Mhairi McDonald, Cochrane (CA); Emily Hicks, Calgary (CA); Dylan Silver, Calgary (CA); Timothy Warrington, Cochrane (CA)

(73) Assignee: FREDsense Technologies Corp., Calgary (CA)

( * ) Notice: Subject to any disclaimer, the term of this patent is extended or adjusted under 35 U.S.C. 154(b) by 887 days.

(21) Appl. No.: 17/598,743

(22) PCT Filed: Mar. 27, 2020

(86) PCT No.: PCT/CA2020/050399
§ 371 (c)(1),
(2) Date: Sep. 27, 2021

(87) PCT Pub. No.: WO2020/191496
PCT Pub. Date: Oct. 1, 2020

(65) Prior Publication Data

US 2022/0152604 A1 May 19, 2022

Related U.S. Application Data

(60) Provisional application No. 62/825,359, filed on Mar. 28, 2019.

(51) Int. Cl.
*B01L 3/02* (2006.01)

(52) U.S. Cl.
CPC ............ *B01L 3/0275* (2013.01); *B01L 3/021* (2013.01); *B01L 2200/026* (2013.01);
(Continued)

(58) Field of Classification Search
None
See application file for complete search history.

(56) References Cited

U.S. PATENT DOCUMENTS

| | | | |
|---|---|---|---|
| 7,335,337 | B1 | 2/2008 | Smith |
| 2001/0039058 | A1 | 11/2001 | Iheme et al. |

(Continued)

FOREIGN PATENT DOCUMENTS

| | | | |
|---|---|---|---|
| CA | 2380042 A1 | 9/2002 | |
| CN | 103068434 A | 4/2013 | |

(Continued)

OTHER PUBLICATIONS

International Search Report and Written Opinion mailed Jun. 8, 2020 in International Patent Application No. PCT/CA2020050399 (12 pages).

(Continued)

*Primary Examiner* — Kathryn Elizabeth Limbaugh
(74) *Attorney, Agent, or Firm* — SMART & BIGGAR LP; Tonino Rosario Orsi

(57) ABSTRACT

Attachment devices for releasable coupling to a fluid dispensing device are provided. The attachment devices include a hollow body comprising a collar portion and a barrel portion extending from the collar portion. The barrel portion has an end portion having a closed end and at least one side opening. Longitudinally positioned along the exterior surface of the barrel is at least one rib branching upwards into two rib branches. When coupled to a fluid dispensing device, the assembly can be used to obtain a fluid sample. Thereafter the assembly can be used to dispense the
(Continued)

fluid sample into an assay vessel so that the fluid sample can then be assayed. Methods for operating the attachment devices, and assemblies containing the attachment devices are also provided.

20 Claims, 10 Drawing Sheets

(52) U.S. Cl.
CPC ... *B01L 2200/0605* (2013.01); *B01L 2200/12* (2013.01); *B01L 2300/0672* (2013.01); *B01L 2400/049* (2013.01)

(56) References Cited

U.S. PATENT DOCUMENTS

| | | | |
|---|---|---|---|
| 2008/0110846 | A1 | 5/2008 | Anderson et al. |
| 2015/0126724 | A1 | 5/2015 | De John et al. |
| 2017/0361323 | A1 | 12/2017 | Guzman et al. |
| 2018/0221863 | A1 | 8/2018 | Cadotte, Jr. et al. |

FOREIGN PATENT DOCUMENTS

| | | | |
|---|---|---|---|
| CN | 204379914 | U | 6/2015 |
| CN | 107941562 | A | 4/2018 |
| CN | 108449960 | A | 8/2018 |
| CN | 109416303 | A | 3/2019 |
| EP | 1685901 | A1 | 8/2006 |
| EP | 1685902 | A1 | 8/2006 |
| JP | 2006208373 | A | 8/2006 |
| KR | 1020160111120 | A | 9/2016 |
| WO | 9308913 | A1 | 5/1993 |
| WO | 2011091308 | A2 | 7/2011 |
| WO | 2019038714 | A1 | 8/2018 |
| WO | 2019217098 | A1 | 11/2019 |

OTHER PUBLICATIONS

Extended European Search Report dated Nov. 24, 2022 in European Patent Application No. 20776944.9 (7 pages).

Office Action mailed Feb. 29, 2024 in China Application No. 202080025552.1 and English Translation (16 pages).

Office Action mailed Sep. 30, 2024 in China Application No. 202080025552.1 and English Translation (17 pages).

ATTACHMENT DEVICE FOR FLUID DISPENSING ASSEMBLIES

RELATED APPLICATION

This application is a 35 USC § 371 national stage entry of International Patent Application No. PCT/CA2020/050399, filed Mar. 27, 2020, which claims the benefit of U.S. Provisional Patent Application No. 62/825,359, filed Mar. 28, 2019; the entire contents of each of which are hereby incorporated by reference.

FIELD OF THE DISCLOSURE

The present disclosure generally relates to fluid dispensing assemblies, and in particular to attachment devices for the operation of fluid dispensing assemblies.

BACKGROUND

The following paragraphs are provided by way of background to the present disclosure. They are not however an admission that anything discussed therein is prior art or part of the knowledge of persons skilled in the art.

There are many circumstances in which fluid analysis is desirable. For example, water can contain chemical species, which must be monitored and maintained within certain tolerances in order to ensure a safe supply of drinking water for domestic purposes. In order to assay water and other fluids a variety of techniques to collect fluid samples and analyze chemical species therein are known to the art.

One class of assays for the detection of chemical species in fluids involves the initial collection of a fluid sample in a fluid dispensing assembly, and subsequent dispensing of the fluid from the device into an assay vessel containing one or more assay reagents. In the practice of this type of assay it is often preferred that the assay vessel remains closed to the ambient environment in order to avoid the introduction of contamination, or to prevent contact of the assay reagents with the environment or humans in instances where such reagents are hazardous. Hence sealed assay vessels containing a penetrable barrier or septum, for example, a foil or film have been developed over time. These sealed assay vessels are commonly operated in conjunction with a fluid dispensing assembly that permits penetration of the barrier and subsequent dispensing of the fluid into the assay vessel. In certain instances, fluid dispensing assemblies can include a disposable end portion, which may be referred to as a tip, to contain and dispense the fluid sample. There are however several challenges associated with tips known in the art. For example, the dispensing of the fluid in a sealed assay vessel can create an undesirable increase in pressure in the assay vessel as the fluid is released into the vessel, which can compromise the dispensing accuracy. Furthermore, the opening of the tip may become blocked as the tip penetrates the seal with the barrier material, or with reagent materials present in the assay vessel, in particular when such reagent materials are present in particulate or crystalline form, thereby negatively affecting the dispensing of the fluid sample into the assay vessel.

Thus, despite the availability of a variety of techniques for the detection of chemical species in fluids, the known techniques are insufficiently effective. There is an ongoing need in the art for improved processes for detecting chemical species in fluids, and in particular there is a need for improved fluid dispensing assemblies, notably the tips of fluid dispensing assemblies.

SUMMARY

The following paragraphs are intended to introduce the reader to the more detailed description that follows and not to define or limit the claimed subject matter of the present disclosure.

In one broad aspect, the present disclosure relates to fluid dispensing devices.

Accordingly, in one aspect, in accordance with the teachings herein, the present disclosure provides, in at least one embodiment, an attachment device for releasable coupling to a fluid dispensing device, the attachment device comprising:

a hollow body having a proximal collar portion with an opening at its proximal end to releasably couple the attachment device to the fluid dispensing device, the collar portion encircling and extending downwards from the proximal opening, and a barrel portion longitudinally tapering downwards from the collar portion towards a distal end portion, the end portion having a closed end and at least one side opening disposed above the closed end, the at least one side opening allowing for aspirating fluid into and dispensing fluid from the hollow body, and the hollow body further having an outer surface with at least one rib extending longitudinally along the outer surface of the barrel portion and branching at a branch point upwards into at least two rib branches to form a channel between the at least two rib branches.

In at least one embodiment, the branch point can be positioned at a position on the exterior surface of the barrel portion so that when the attachment device is inserted into an assay vessel, the branch point is not submerged in fluid present in the assay vessel.

In at least one embodiment, the attachment device can comprise additional ribs extending longitudinally along the outer surface of the barrel portion, with at least one of the additional ribs branching upwards into at least two rib branches to form a channel between the rib branches.

In at least one embodiment, the attachment device can comprise additional ribs extending longitudinally along the outer surface of the barrel portion, each of the ribs branching upwards into at least two rib branches to form channels between the additional rib branches.

In at least one embodiment, the attachment device can comprise at least three additional ribs extending longitudinally along the outer surface of the barrel portion, the ribs further forming at least four additional channels between the ribs.

In at least one embodiment, the attachment device can comprise three additional ribs extending longitudinally along the outer surface of the barrel, wherein one of the additional ribs branches upwards into two rib branches to form two channels between the rib branches and two of the additional ribs are unbranched, the four ribs further forming four additional channels between the ribs.

In at least one embodiment, the two unbranched ribs can be positioned on first opposite sides of the barrel and the two branched ribs can be positioned on second opposite sides of the barrel.

In at least one embodiment, the attachment device comprises additional ribs extending longitudinally along the outer surface of the barrel, wherein all of the additional ribs branch upwards into two rib branches to form two channels between the rib branches, the additional ribs further forming a plurality of additional channels between the additional ribs.

In at least one embodiment, the ribs can be radially equally spaced apart.

In at least one embodiment, one or more of the ribs can extend upwards from a first point on the outer surface of the barrel portion above the end portion to a second point on the outer surface of the collar portion.

In at least one embodiment, one or more of the ribs can include an outward flaring portion which during use upon contact between the outward flaring portion and a barrier of an assay vessel covered by the barrier, the output flaring portion stops further entry of the attachment device into the assay vessel.

In at least one embodiment, the radially outward flaring portion can be on at least one of the branches of at least one rib.

In at least one embodiment, the end portion of the attachment device can include at least two side openings.

In at least one embodiment, the end portion of the attachment device can include two side openings positioned at opposite sides of the barrel.

In at least one embodiment, the exterior surface of the closed end portion can represent a portion of the circumference of an imaginary sphere having a diameter of about 3 mm or less.

In at least one embodiment, the exterior surface of the closed end portion can represent a portion of the circumference of an imaginary sphere having a diameter of from about 1.5 mm to about 3 mm.

In at least one embodiment, the closed end portion can be sufficiently pointed to penetrate the barrier and insufficiently pointed to rupture human skin upon accidental contact between the pointed distal end portion and human skin.

In at least one embodiment, the attachment device can be fabricated by injection molding or 3D-printing.

In at least one embodiment, the attachment device can be composed of a single material.

In at least one embodiment, the attachment device can be composed of a composite material.

In at least one embodiment, the material includes a plastic material.

In at least one embodiment, the plastic material can be a polypropylene, a polyethylene, a polyethylene terephthalate, or a polycarbonate material.

In another aspect, the present disclosure provides, in at least one embodiment, a method of assembling a fluid dispensing assembly, the method comprising:

- obtaining a fluid dispensing device;
- obtaining an attachment device for releasable attachment to the fluid dispensing device, the attachment device comprising:
  - a hollow body having a proximal collar portion with an opening at its proximal end to releasably couple the attachment device to the fluid dispensing device, the collar portion encircling and extending downwards from the proximal opening, and a barrel portion longitudinally tapering downwards from the collar portion towards a closed distal end portion having a closed end and at least one side opening above the closed end, and the hollow body further having an outer surface with one rib extending longitudinally along the outer surface of the barrel and branching at a branch point upwards into at least two rib branches to form a channel between the at least two rib branches; and
- inserting a lower portion of the fluid dispensing device into the collar portion of the attachment device.

In at least one embodiment, the dispensing device and attachment device can be sealably frictionally coupled by application of sufficient force in a general longitudinal direction between the inner surface of the collar portion and the outer surface of the lower portion of the fluid dispensing device.

In at least one embodiment, the dispensing device and attachment device can be sealably coupled using a coupling requiring a rotational action to establish the coupling.

In at least one embodiment, an outer surface of a lower portion of the dispensing device can comprise threads and an inner surface of an upper portion of the attachment device comprises grooves sized for accepting the threads and the method comprises rotating the attachment device with respect to the dispensing device to obtain a threaded coupling therebetween.

In at least one embodiment, the coupling can be a Luer-lock style coupling.

In another aspect, the present disclosure provides, in at least one embodiment, a method for detecting a fluid parameter in a fluid sample, the method comprising:

- obtaining a fluid dispensing assembly comprising a fluid dispensing device that is releasably attached to an attachment device, the attachment device comprising a hollow body having a proximal collar portion with an opening at its proximal end to releasably couple the attachment device to the fluid dispensing device, the collar portion encircling and extending downwards from the proximal opening, and a barrel portion longitudinally tapering downwards from the collar portion towards a distal end portion having a closed end, and at least one side opening above the closed end portion, and the hollow body further having an outer surface with one rib extending longitudinally along the outer surface of the barrel and branching at a branch point upwards into at least two rib branches to form a channel between the at least two rib branches;
- aspirating a fluid comprising a fluid parameter from a fluid source through the at least one side opening into the hollow body of the attachment device to thereby obtain a fluid sample contained in the attachment device;
- moving the closed pointed distal end portion of the attachment device with sufficient force to penetrate a barrier covering an assay vessel to thereby fluidically connect the hollow body of the attachment device and an interior of an assay vessel, the assay vessel comprising one or more reagents for the detection of the fluid parameter; and
- dispensing the fluid sample from the attachment device into the assay vessel to allow detection of the fluid parameter.

In at least one embodiment, the assay vessel can be an assay vessel for the voltammetric detection of the fluid parameter.

In another aspect, the present disclosure provides, in at least one embodiment, a fluid dispensing assembly comprising a fluid dispensing device having a fluid reservoir, the fluid dispensing device being releasably attachable to an attachment device, the attachment device comprising a hollow body having a proximal collar portion with an opening at its proximal end to releasably couple the attachment device to the fluid dispensing device, the collar portion encircling and extending downwards from the proximal opening, and a barrel portion longitudinally tapering downwards from the collar portion towards a distal end portion having a closed distal end and at least one side opening above the closed end, and the hollow body further having an outer surface with one rib extending longitudinally along the outer surface of the barrel and branching at a branch point upwards into two rib branches to form a channel between the rib branches.

In another aspect, the present disclosure provides, in at least one embodiment, an assembly for the detection of a fluid parameter in a fluid sample, the assembly comprising:

- a fluid dispensing device having a fluid reservoir, the fluid dispensing device being releasably attachable to an attachment device, the attachment device comprising a hollow body having a proximal collar portion at an upper end, the collar portion having an opening at its proximal end to releasably couple the attachment device to the fluid dispensing device, the collar portion encircling and extending downwards from the proximal opening, and a barrel portion longitudinally tapering downwards from the collar portion towards a distal end portion having a closed end and at least one side opening disposed above the closed end, and the hollow body further having an outer surface with one rib extending longitudinally along the outer surface of the barrel and branching at a branch point upwards into two rib branches to form a channel between the rib branches; and
- an assay vessel capable of receiving the lower end portion of the attachment device.

In at least one embodiment, the assay vessel can be a closed assay vessel comprising a barrier made of a material that is penetrable by the closed end of the distal end portion of the attachment device.

In another aspect, the present disclosure provides, in at least one embodiment, a use of an attachment device for the aspiration of a fluid, wherein the use comprises:

- releasably coupling the attachment device to a fluid dispensing device, the attachment device comprising a hollow body having a proximal collar portion with an opening at its proximal end to releasably couple the attachment device to the fluid dispensing device, the collar portion encircling and extending downwards from the proximal opening, and a barrel portion longitudinally tapering downwards from the collar portion towards a distal end portion having a closed end and at least one side opening, and the hollow body further having an outer surface with one rib extending longitudinally along the outer surface of the barrel portion and branching at a branch point upwards into two rib branches to form a channel between the rib branches; and
- aspirating the fluid into the fluid dispensing device through the attachment device through the at least one side opening.

Other features and advantages of the present disclosure will become apparent from the following detailed description. It should be understood, however, that the detailed description, while indicating preferred implementations of the present disclosure, is given by way of illustration only, since various changes and modification within the spirit and scope of the disclosure will become apparent to those of skill in the art from the detailed description.

BRIEF DESCRIPTION OF THE DRAWINGS

The disclosure is in the hereinafter provided paragraphs described, by way of example, in relation to the attached figures. The figures provided herein are provided for a better understanding of the example embodiments and to show more clearly how the various embodiments may be carried into effect. Like numerals designate like or similar features throughout the several views possibly shown situated differently or from a different angle. Thus, by way of example only, part 250 in FIG. 2B, FIGS. 3A-3D and FIGS. 4A-4D refers to a fluid dispensing assembly in each of these figures. The figures are not intended to limit the present disclosure.

Figure 1A:
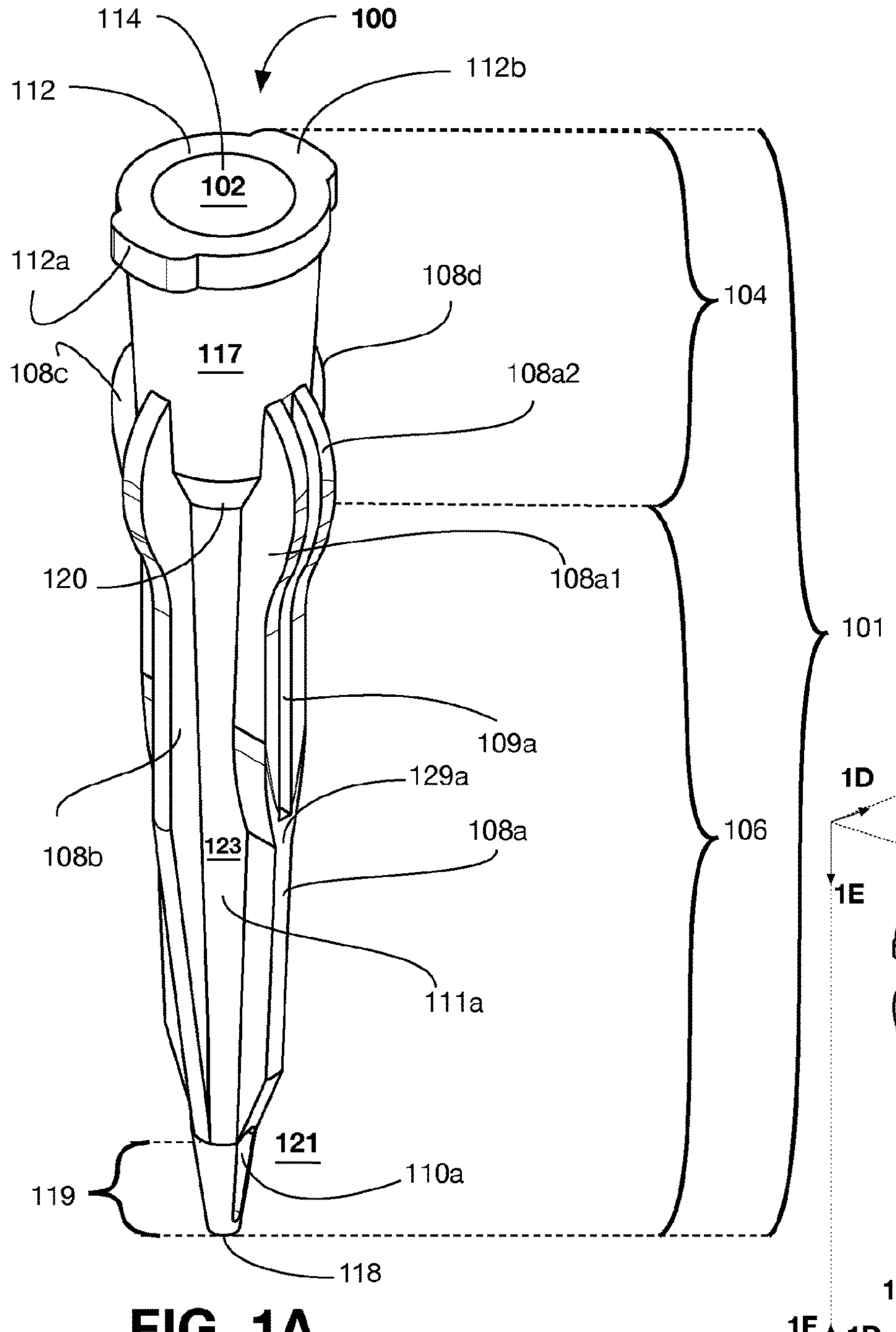
FIG. 1A is a perspective view of an example embodiment of an attachment device.
Figure 1B:
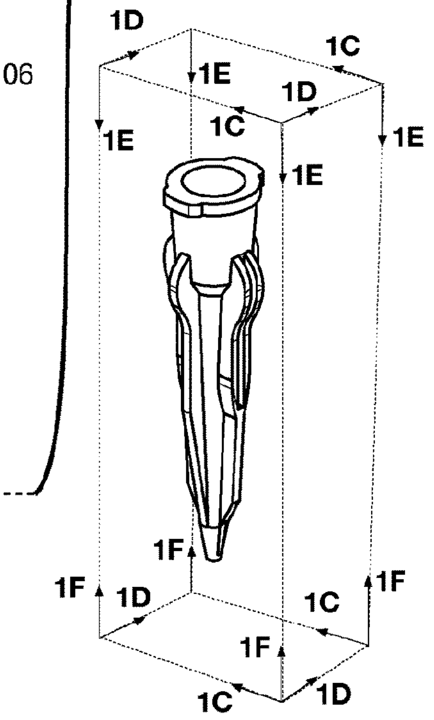
FIG. 1B is a compressed view of the embodiment shown in FIG. 1A showing various planes from which the images in FIGS. 1C-1F are shown.

The figures together with the following detailed description make apparent to those skilled in the art how the disclosure may be implemented in practice.

DETAILED DESCRIPTION

Various processes, systems and compositions will be described below to provide at least one example of at least one embodiment of the claimed subject matter. No embodiment described below limits any claimed subject matter and any claimed subject matter may cover processes, systems, or compositions that differ from those described below. The claimed subject matter is not limited to any process, system, or composition having all of the features of processes, systems, or compositions described below, or to features common to multiple processes, systems, compositions or compositions described below. It is possible that a process, system, or composition described below is not an embodiment of any claimed subject matter. Any subject matter disclosed in processes, systems, or compositions described below that is not claimed in this document may be the subject matter of another protective instrument, for example, a continuing patent application, and the applicants, inventors or owners do not intend to abandon, disclaim or dedicate to the public any such subject matter by its disclosure in this document.

As used herein and in the claims, the singular forms, such as "a", "an" and "the" include the plural reference and vice versa unless the context clearly indicates otherwise. Throughout this specification, unless otherwise indicated, the terms "comprise," "comprises" and "comprising" are used inclusively rather than exclusively, so that a stated integer or group of integers may include one or more other non-stated integers or groups of integers. The term "or" is inclusive unless modified, for example, by "either". The term "and/or" is intended to represent an inclusive or. That is "X and/or Y" is intended to mean X or Y or both X and Y, for example. As a further example, X, Y and/or Z is intended to mean X or Y or Z or any combination thereof.

When ranges are used herein for geometric dimensions, physical properties, such as molecular weight, or chemical properties, such as chemical formulae, all combinations and sub-combinations of ranges and specific embodiments therein are intended to be included. Other than in the operating examples, or where otherwise indicated, all numbers expressing quantities of ingredients or reaction conditions used herein should be understood as being modified in all instances by the term "about." The term "about" when referring to a number or a numerical range means that the number or numerical range referred to is an approximation within experimental variability (or within statistical experimental error), and thus the number or numerical range may vary between 1% and 15% of the stated number or numerical range, as will be readily recognized by the context. Furthermore, any range of values described herein is intended to specifically include the limiting values of the range, and any intermediate value or sub-range within the given range, and all such intermediate values and sub-ranges are individually and specifically disclosed (e.g. a range of 1 to 5 includes 1, 1.5, 2, 2.75, 3, 3.90, 4, and 5). Similarly, other terms of degree such as "substantially" and "approximately" as used herein mean a reasonable amount of deviation of the modified term such that the end result is not significantly changed. These terms of degree should be construed as including a deviation of the modified term, such as up to 15% for example, if this deviation would not negate the meaning of the term it modifies.

Several directional terms such as "above", "below", "lower", "upper", "inner" and "outer" are used herein for convenience including for reference to the drawings. In general, the terms "upper", "above", "upward" and similar terms are used to refer to an upwards direction or upper portion in relation to an attachment device generally held upright, for example, such as shown in the orientation shown in FIG. 1A. Similarly, the terms "lower", "below", "downward", and "bottom" are used to refer to a downwards direction or a lower portion in relation to an attachment device generally held upright, such as when attached to a fluid dispensing device, for example, such as shown in the orientation shown in FIG. 1A. The terms "inner" and "inward" are used herein to refer to a direction that is more radially central relative to a generally central longitudinal axis of a component, while the terms "outer" and "outward" refer to a direction that is more radially outward relative to the generally central longitudinal axis of a component.

Unless otherwise defined, scientific and technical terms used in connection with the formulations described herein shall have the meanings that are commonly understood by those of ordinary skill in the art. The terminology used herein is for the purpose of describing particular embodiments only, and is not intended to limit the scope of the presently claimed subject matter, which is defined solely by the claims.

All publications, patents, and patent applications referred herein are herein incorporated by reference in their entirety to the same extent as if each individual publication, patent or patent application was specifically indicated to be incorporated by reference in its entirety.

In general, the attachment device of the present disclosure can be used to releasably attach to a fluid dispensing device. When attached to a fluid dispensing device, the attachment device can be used to obtain a fluid sample from a source fluid and contain the sample therein. Subsequently the fluid sample can be later dispensed from the attachment device.

In broad terms, the attachment device includes a hollow body, in which fluid can be received by aspiring the fluid through a side opening in the hollow body. The hollow body includes a closed pointed distal end portion, and further includes ribs configured to form longitudinally extending channels on the exterior surface of the hollow body. The attachment device is particularly suitable for transferring fluid samples to closed assay vessels having a penetrable barrier.

A challenge of many known devices for penetrating closed assay vessels is that the release of the fluid sample from the devices into the assay vessels can be difficult since release of the fluid sample from the device results in an increase of pressure in the assay vessel. It may be difficult to overcome the resistance provided by this increased pressure, and in addition fluid, and/or fluid sample and/or assay reagents fluid may escape from the assay vessel, for example in the form of sprayed fluid, as the fluid sample is being introduced in the assay vessel, thus impacting the volume of the fluid sample that is dispensed, and potentially negatively affecting the assay results. In addition, contact between human skin and the sprayed fluid may occur, which, depending on the fluid, can be hazardous. By contrast, at least one embodiment of the current attachment device can limit the increase of pressure in the assay vessel when dispensing a fluid therein. This allows for accurate and safe dispensing of the fluid from the attachment device into the assay vessel.

The attachment device of the present disclosure can also be used to penetrate a barrier covering a closed assay vessel. One further challenge with many known devices for delivering a fluid sample into closed assay vessels is that the opening of the devices becomes plugged upon penetration of the device into the closed assay vessel, either by barrier material that is used to close the assay vessel, or by crystalline or particulate reagents present in the assay vessel. The closed opening of the attachment device subsequently hinders the performance of the assay, since it may be difficult to release the fluid sample from the device. By contrast, inadvertent blocking of the opening of at least one embodiment of the attachment device of the present disclosure can be limited.

Furthermore, the attachment device of the present disclosure can be used to obtain a sample of a source fluid at the site of the source fluid, for example at a site where one desires to test water quality and then later dispense the fluid sample. This allows for rapid analysis of the fluid sample and avoids having to store and transport fluid samples.

In what follows selected example embodiments are described with reference to the drawings.

Figure 1C:
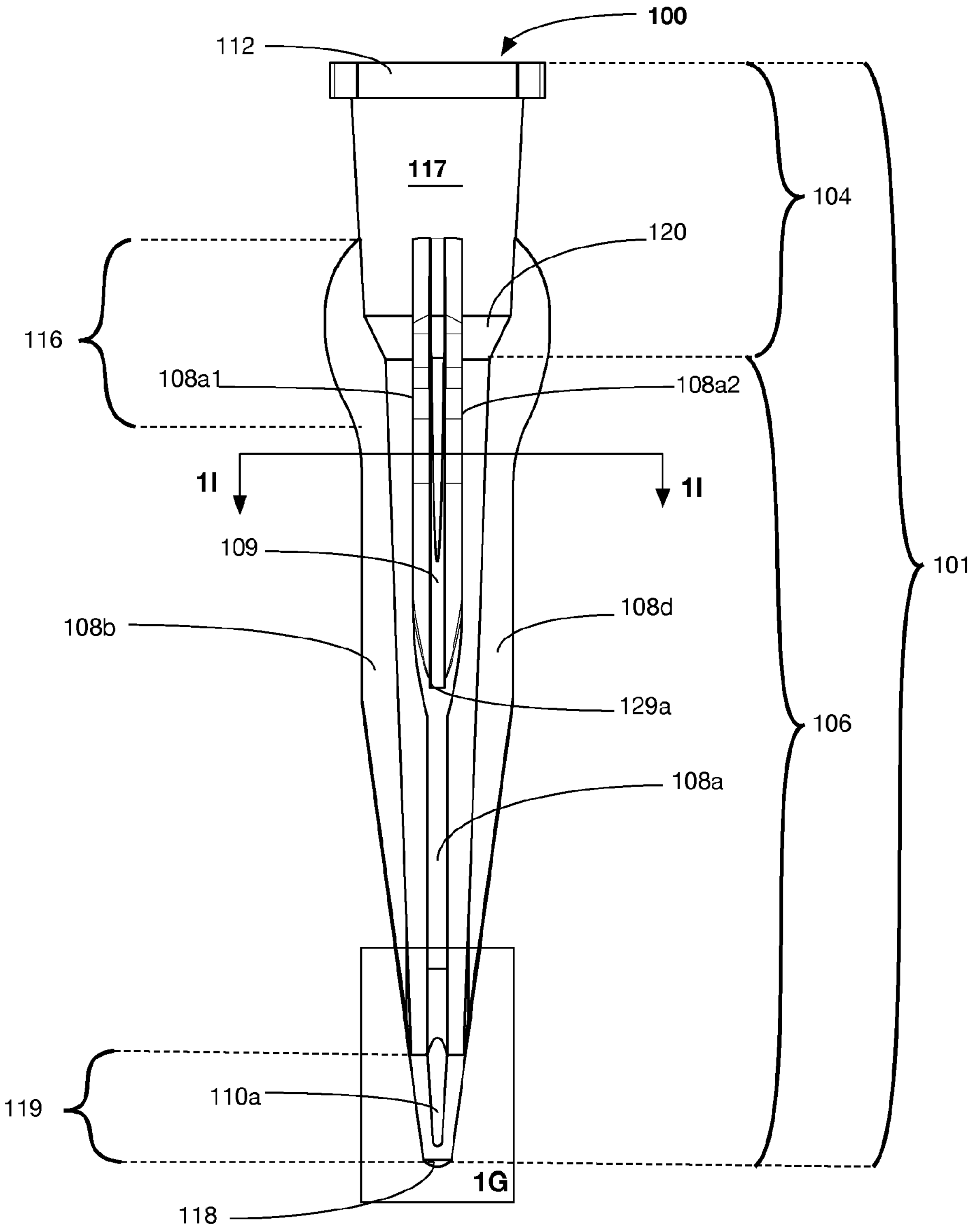
FIG. 1C is a side view of the attachment device taken from the vantage point of the plane 1C in FIG. 1B.
Figure 1D:
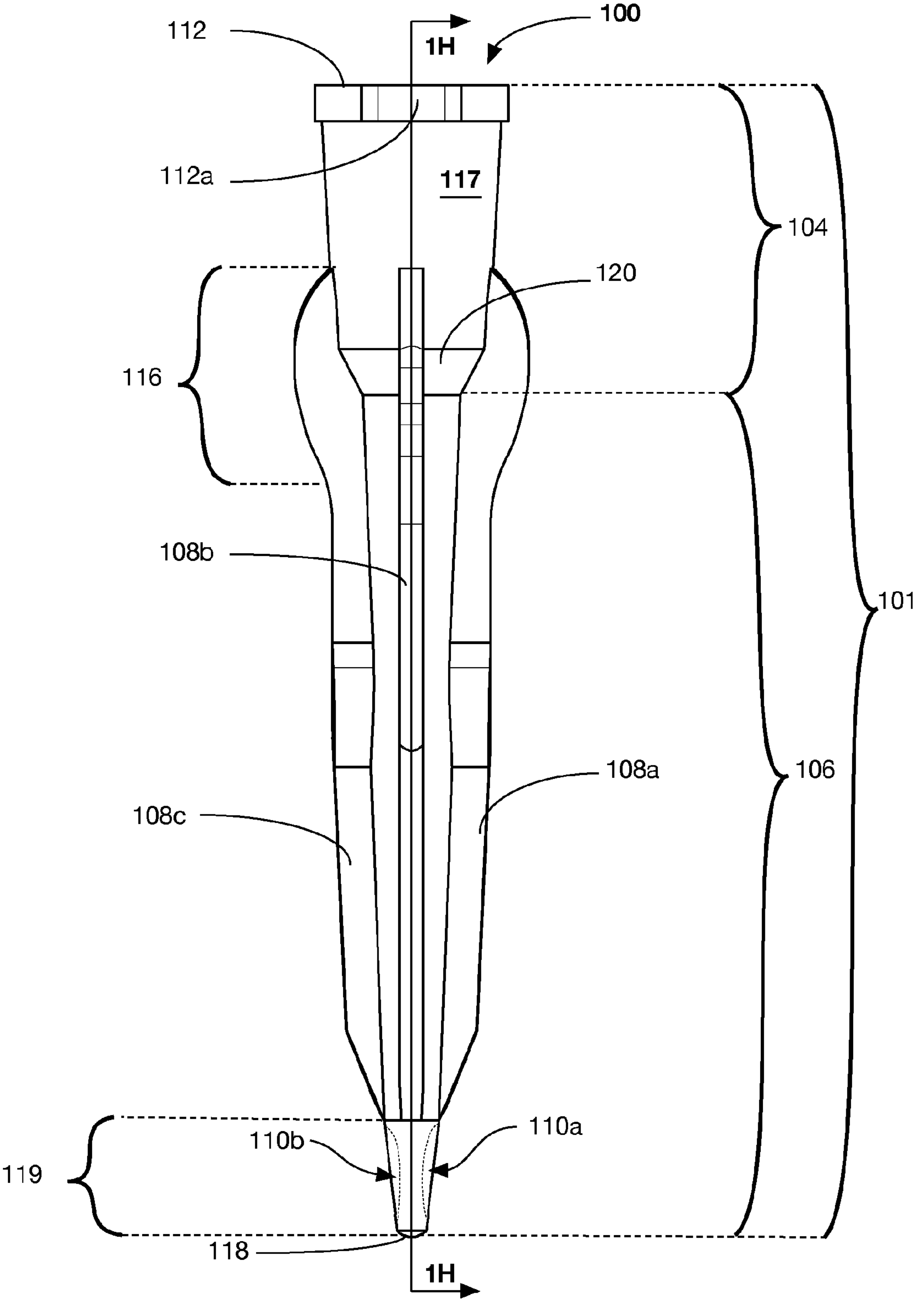
FIG. 1D is a front view of the attachment device taken from the vantage point of the plane 1D in FIG. 1B.
Figure 1E:
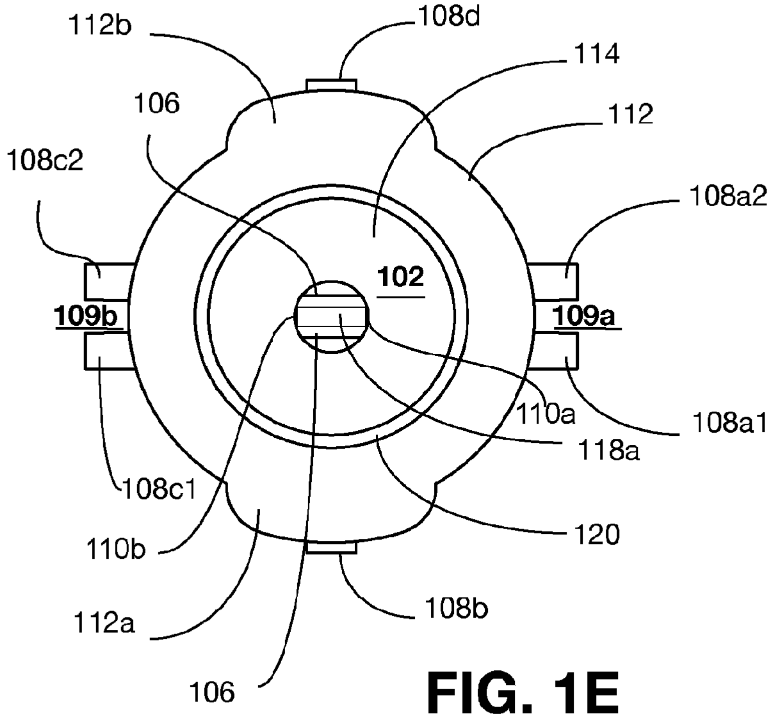
FIG. 1E is a top view of the attachment device taken from the vantage point of the plane 1E in FIG. 1B.
Figure 1F:
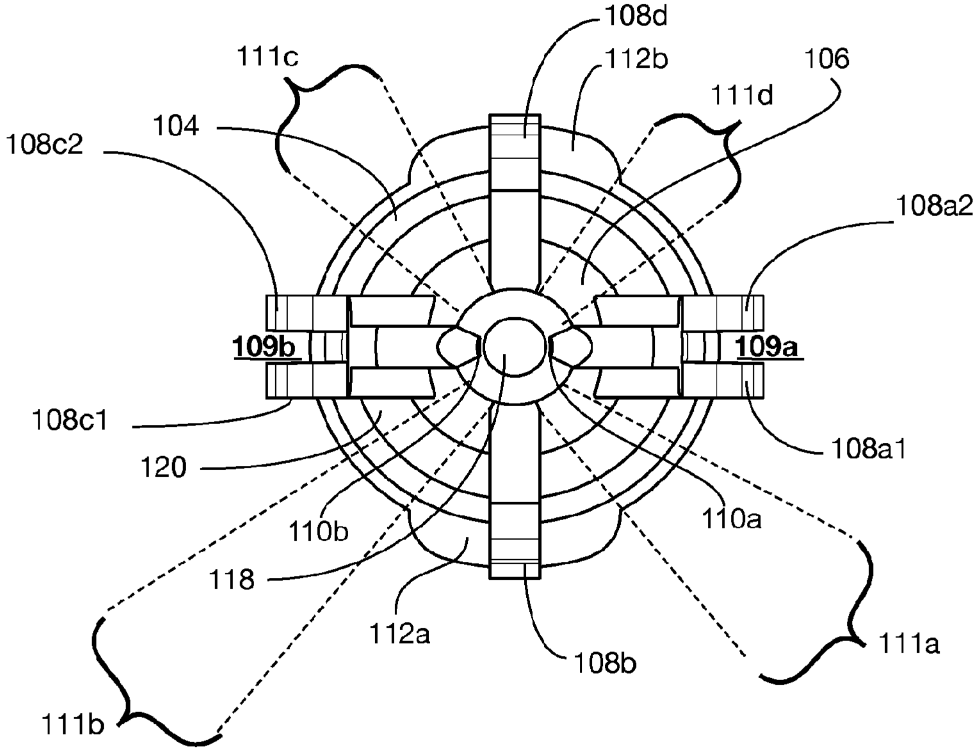
FIG. 1F is a bottom view of the attachment device taken from the vantage point of the plane 1F in FIG. 1B.
Figure 1G:
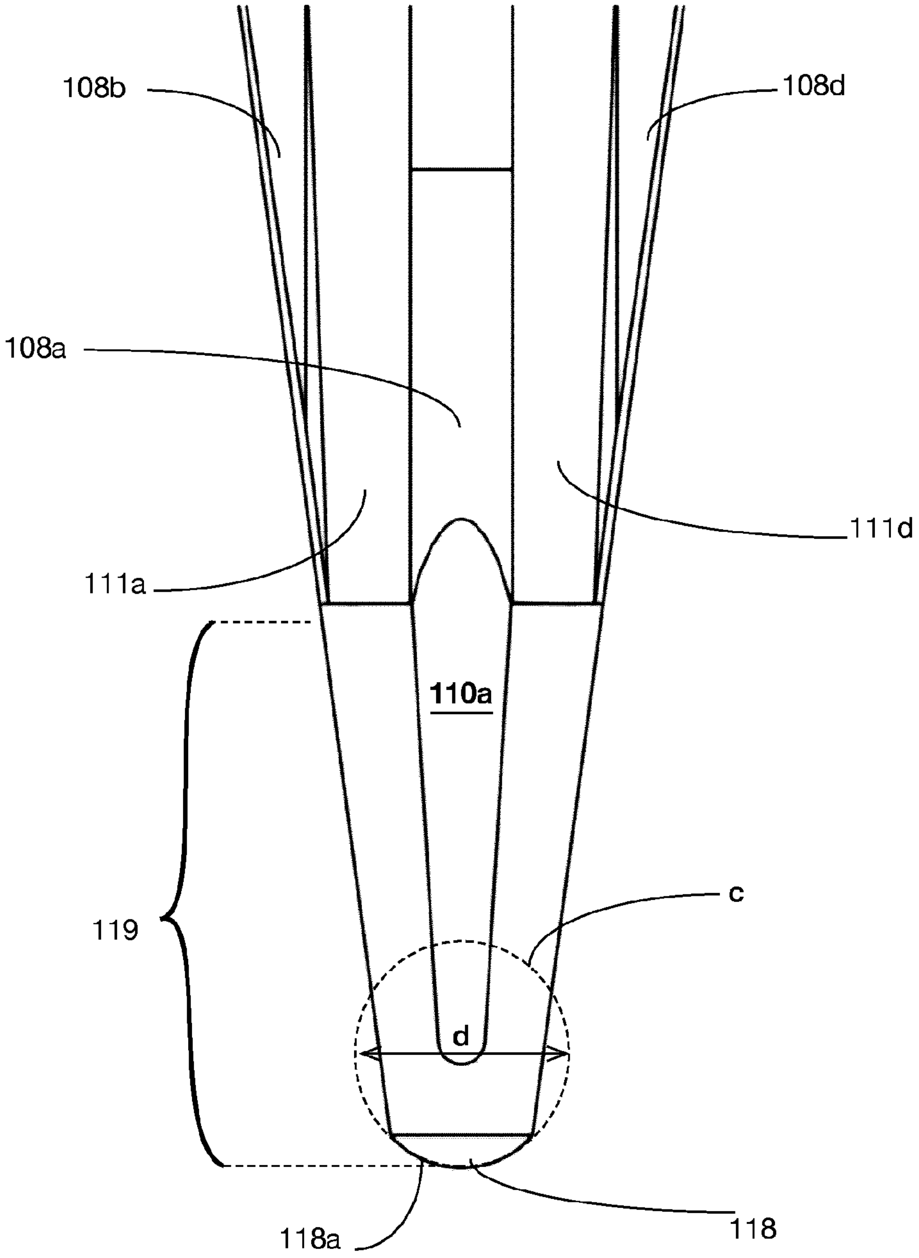
FIG. 1G is an enlarged side view of the area marked 1G and in FIG. 1C.
Figure 1H:
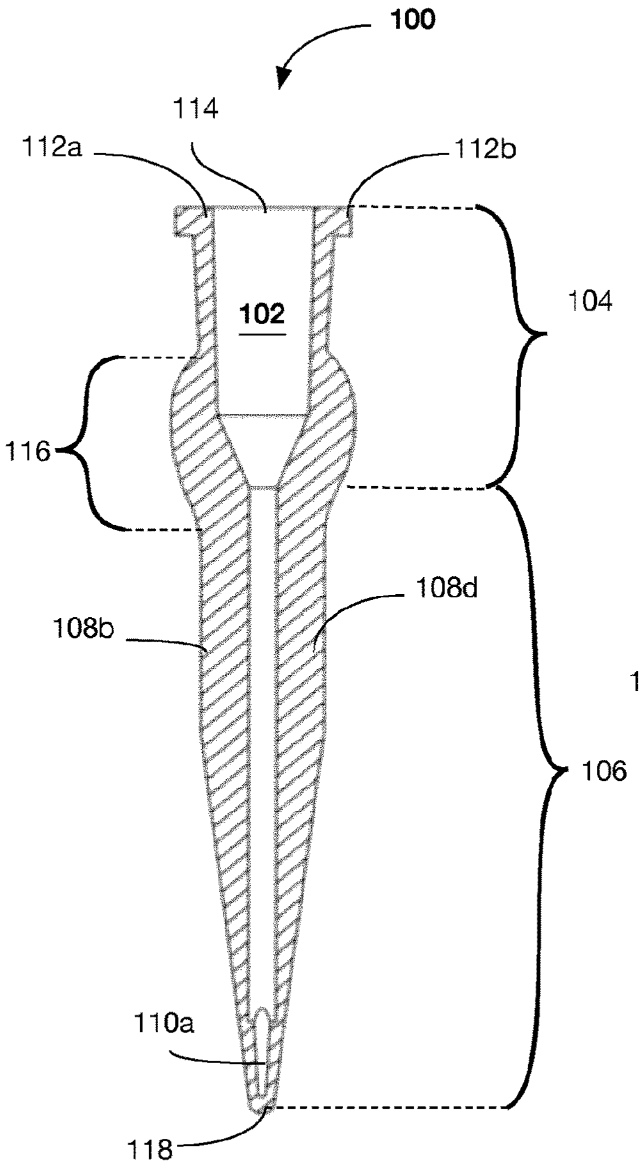
FIG. 1H is a vertical cross section view of the attachment device along the plane marked by 1H in FIG. 1D.
Figure 1I:
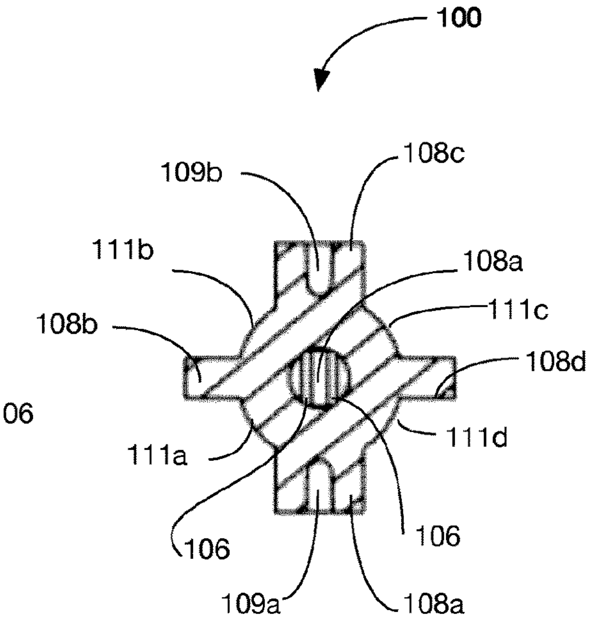
FIG. 1I is a horizontal cross section along the plane marked by 1I in FIG. 1C.
Figure 2A:
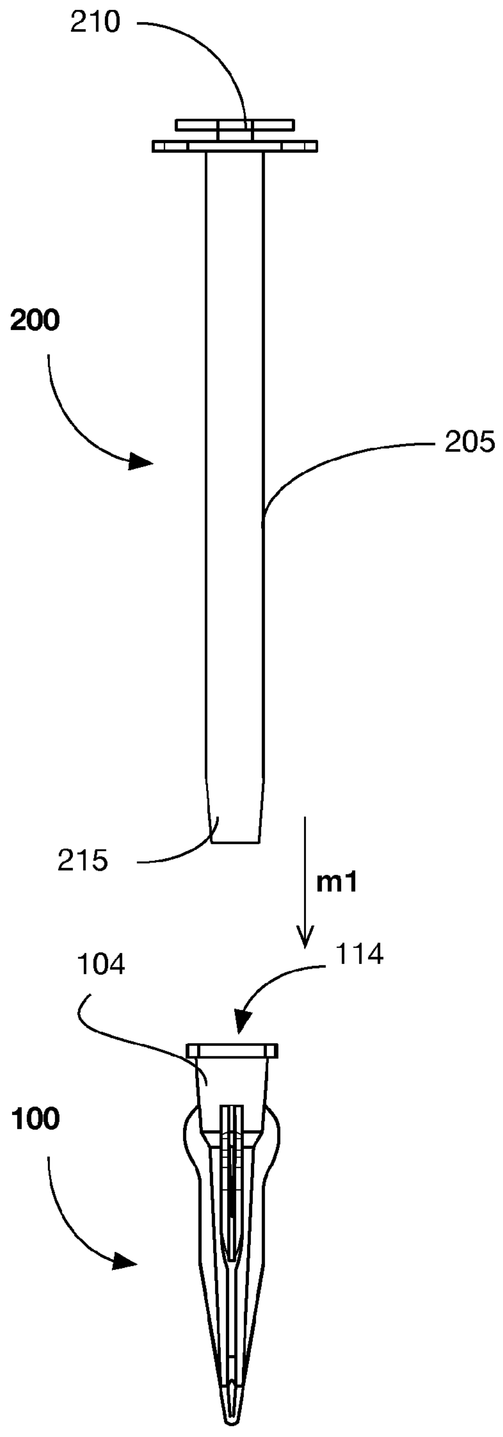
FIG. 2A is a side view of an attachment device and a fluid collection device showing the attachment device detached from the fluid collection device.
Figure 2B:
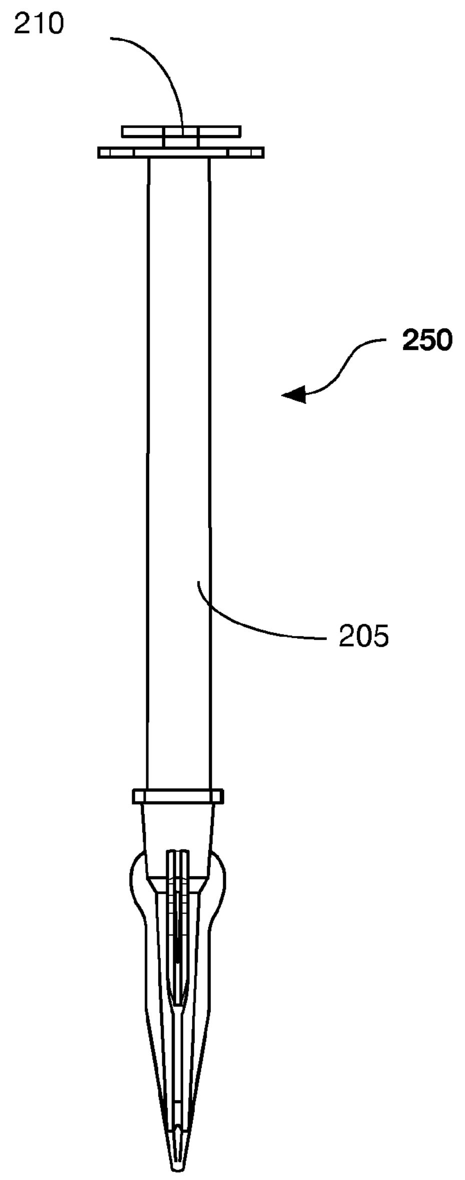
FIG. 2B is a side view of an attachment device and a fluid collection device showing the attachment device attached to the fluid collection device.
Figures 3A, 3B, 3C, 3D:
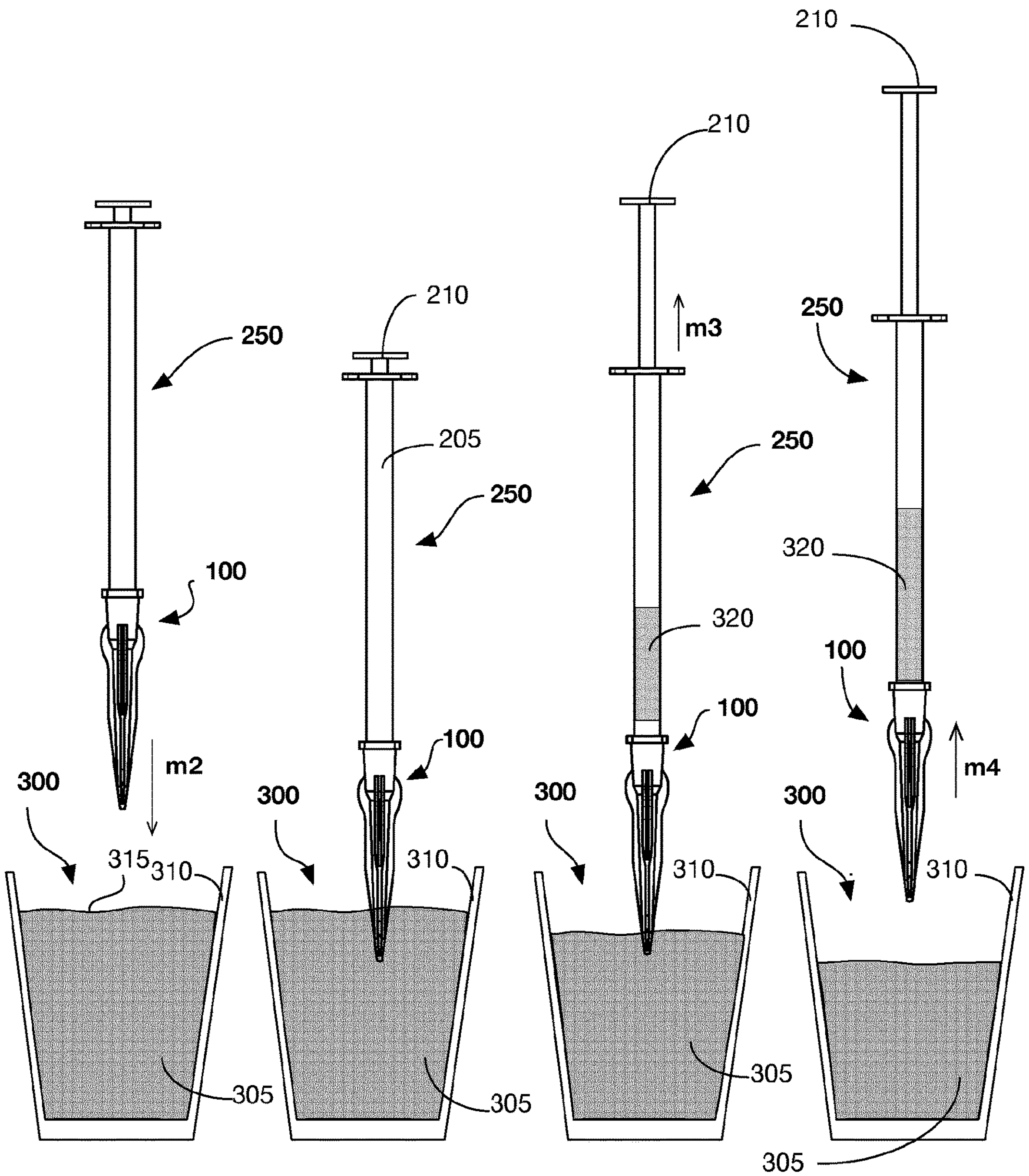
FIG. 3A is a side view of a fluid dispensing assembly including an embodiment of an attachment device and a fluid sample in a first state.
FIG. 3B is a side view of a fluid dispensing assembly including an embodiment of an attachment device and a fluid sample in a second state.
FIG. 3C is a side view of a fluid dispensing assembly including an embodiment of an attachment device and a fluid sample in a third state.
FIG. 3D is a side view of a fluid dispensing assembly including an embodiment of an attachment device and a fluid sample in a fourth state.
Figures 4A, 4B, 4C, 4D:
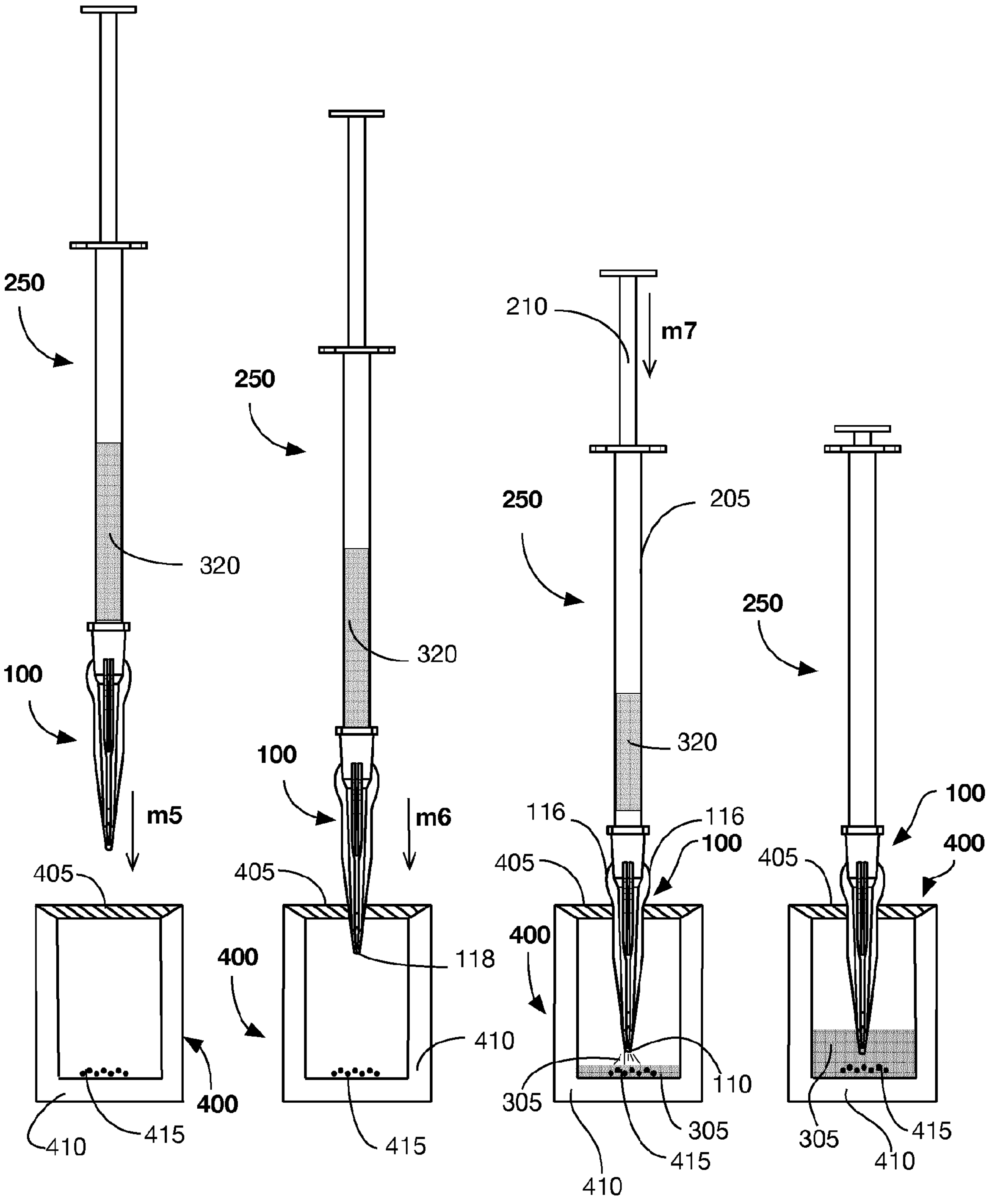
FIG. 4A is a side view of a fluid dispensing assembly including an embodiment of an attachment device and an assay vessel in a first state.
FIG. 4B is a side view of a fluid dispensing assembly including an embodiment of an attachment device and an assay vessel in a second state.
FIG. 4C is a side view of a fluid dispensing assembly including an embodiment of an attachment device and an assay vessel in a third state.
FIG. 4D is a side view of a fluid dispensing assembly including an embodiment of an attachment device and an assay vessel in a fourth state.
Figure 5:
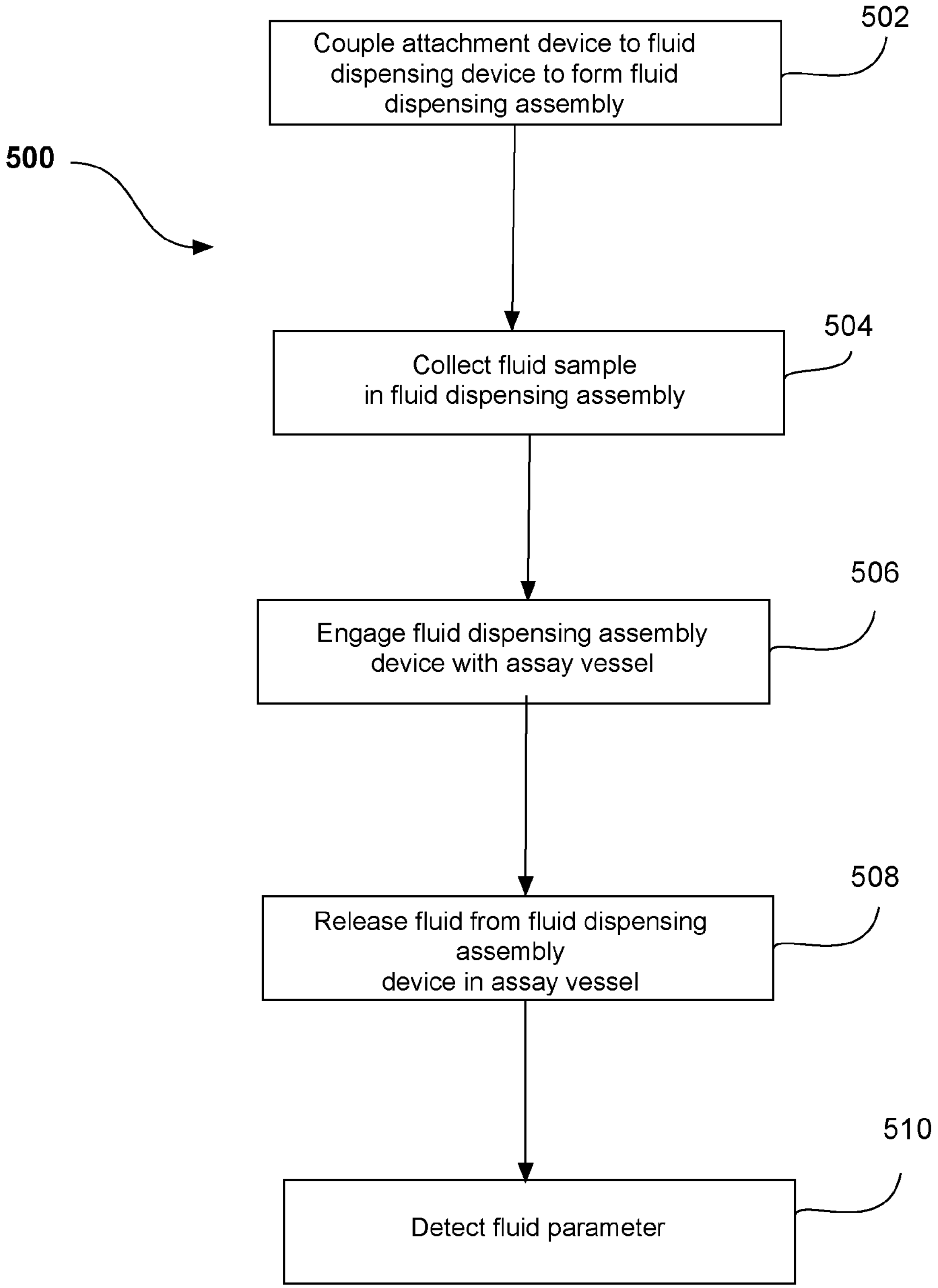
FIG. 5 is a flow chart showing an example embodiment of a method of operating a fluid dispensing assembly for detecting a fluid parameter.

In a general overview, FIGS. 1A-1I show several views of an example embodiment of an attachment device 100. FIGS. 2A-2B show several views of an example embodiment of an operational method of engaging an attachment device 100 with a fluid collection device 200. FIGS. 3A-3D show an example operational embodiment of attachment device 100 in operation in conjunction with fluid collection device 200 and source fluid 300. FIGS. 4A-4D show an example operational embodiment of attachment device 100 in operation in conjunction with fluid collection device 200 and assay vessel 400. FIG. 5 shows a flow chart of an example method of operating attachment device 100 together with fluid collection device 200.

Referring initially to FIGS. 1A-1I, shown therein is example embodiment of attachment device 100 for releasable coupling to a fluid dispensing device or a fluid collection device (both not shown). It is noted that the terms "fluid dispensing device" and "fluid dispensing assembly", and "fluid collection device" and "fluid collection assembly" may be used herein to refer to the same fluid handling device. It will be understood, that in some instances, as will be generally clear from the context, the device/assembly may be empty and can be used to collect fluid, and hence can be referred to as a fluid collection device/assembly, and in other instances, the device/assembly may contain fluid and can be used to dispense fluid, and hence can be referred to as a fluid dispensing device/assembly.

Attachment device 100 includes hollow body 101 comprising proximal collar portion 104 and distal barrel portion 106. Inward tapering distal end portion 120 of collar portion 104, disposed at the distal end of collar portion 104, extends to collar portion 104 and barrel portion 106. Barrel portion 106 extends downwards from collar portion 104, as can readily be appreciated by referring in particular to FIG. 1A, FIG. 1C and FIG. 1D. Together collar portion 104 and barrel portion 106 encircle and define longitudinally extending hollow interior 102 which acts as fluid conduit during collection or release of a sample fluid. Collar portion 104 comprises proximal opening 114 defined by a ring portion 112 of collar portion 104 for receiving a fluid dispensing device and releasably coupling attachment device 100 to the fluid dispensing device (as hereinafter further described and shown in FIGS. 2A-2B). Downward tapering wall 117 of collar portion 104 facilitates the slideable frictional coupling of a fluid dispensing device to collar portion 104. In addition, ring portion 112 of the collar portion 104 includes coupling portions 112*a* and 112*b*, which can mate with threaded counterpart coupling portions such as are included in syringes known to the art as Luer-Lock syringes (ISO #594) in order to effect receipt and coupling of attachment device 100 to the fluid dispensing device.

Barrel portion 106 tapers downwards from the distal end of collar portion 104 to distally form end portion 119 comprising closed distal end 118 (see: FIGS. 1C and 1D, for example), which is sufficiently pointed to penetrate penetrable barriers of assay vessels as hereinafter further described with reference to FIGS. 4A-4D. Exterior distal surface 118*a* of closed distal end 118 represents part of the circumference of an imaginary sphere c having a diameter d (see: FIG. 1G). The size of diameter d in different embodiments can vary. In preferred embodiments, diameter d is no larger than about 5.0 mm, or, for example, between about 0.5 mm and about 5.0 mm. Such geometry and geometric dimensions of closed distal end 118 and its exterior distal surface allow on the one hand for penetration by attachment device 100 of penetrable barriers of assay vessels, while on the other hand limiting the risk of rupturing the skin of a user during accidental contact of a user with distal end 118 of end portion 119. In other embodiments, closed distal end 118 can have other geometries and other geometric dimensions, provided they permit penetration of the attachment device of a penetrable barrier. Thus, for example, in other embodiments, exterior distal surface 118*a* can be designed such as to not be part of the circumference of an imaginary sphere, and can, for example, include an angled exterior surface or an elliptical surface, a pointed pyramidal surface, or a pointed conical surface. However, taking into consideration operational safety of use of the attachment device, geometries having sharp points may be less desirable.

End portion 119 of barrel portion 106 further comprises two side openings 110*a* and 110*b* on opposite sides of barrel portion 106, providing fluidic connection between hollow interior 102 of the body 101 and the exterior surroundings 121 (see: FIG. 1A) near the end portion 119 of attachment device 100. When in use, as further shown in FIGS. 3A-3D and 4A-4D, fluid can be aspirated from exterior surroundings 121 into hollow interior 102 of hollow body 101 through side openings 110*a* and 110*b*, or conversely, be expelled from hollow interior 102 of hollow body 101 through side openings 110*a* and 110*b*. In other embodiments, only one side opening can be included. In other embodiments, 3 or more side openings, for example 4 to 6 side openings, can be included, as long as the number and/or size of the openings do not deteriorate the structural integrity of end portion 119.

Hollow body 101 further includes four ribs 108*a*, 108*b*, 108*c* and 108*d*, extending gradually outwards and upwards from end portion 119 relative to and along exterior surface 123 of barrel portion 106, and further extending upwards along a portion of wall 117 of collar portion 104. Ribs 108*a*, 108*b*, 108*c* and 108*d* are approximately radially equidistally spaced apart. Approximately half way up the length of barrel portion 106, ribs 108*a* and 108*c*, positioned opposite one another on hollow body 101, each branch from branch points (shown as 129*a* for rib 108*a*; the branch point for rib 108*c* is not visible). Thus ribs 108*a* and 108*c* branch into rib branches 108*a*1 and 108*a*2, and rib branches 108*c*1 and 108*c*2, respectively. Rib branches 108*a*1 and 108*a*2 define channel 109*a*, and rib branches 108*c*1 and 108*c*2 define channel 109*b*, as can be seen, for example in FIGS. 1E-1F and 1I. Ribs 108*b* and 108*d*, also positioned opposite one another on hollow body 101, are unbranched. Referring further, in particular to FIGS. 1E-1F, and 1I additional upward extending channels 111*a*, 111*b*, 111*c* and 111*d* are defined by ribs 108*a* and 108*b*, 108*b* and 108*c*, 108*c* and 108*d*, and 108*d* and 108*a*, respectively. Thus being defined, channels 111*a*, 111*b*, 111*c* and 111*d*, extend upwards from end portion 119 and have a greater length than channels 109*a* and 109*b*. Ribs 108*a*, 108*b*, 108*c* and 108*d* further include outward flaring portions 116 towards the upper portion of each of the ribs. In use, in conjunction with a closed assay vessel, channels 109*a* and 109*b*, as well as additional channels 111*a*, 111*b*, 111*c* and 111*d* allow air to escape from the closed assay vessel, as hereinafter further described and shown with reference to FIGS. 4A-4D. Non-branching ribs do not permit the escape of air (except via channels between separate adjacent ribs), however they can facilitate manufacture of attachment device 100, for example, when the attachment device 100 is manufactured by injection molding. Furthermore, the non-branching ribs can provide structural stability to hollow body 100.

It is noted that with respect to the ribs and rib configurations a wide variety of alternate embodiments are possible in accordance with the present disclosure, provided however that the attachment device of the present disclosure includes at least one branching rib 108. In embodiments including a single branching rib 108, channels 111*a*-111*d* can be said to be absent. Alternate embodiments include, for example, embodiments varying with respect to the number of ribs, relative placement of ribs on the exterior surface 123, and geometry of the ribs. In what follows next several possible rib configurations are described.

In at least one embodiment, one, two, three, four, five six, seven or eight branching ribs can be included.

Alternatively, in at least one embodiment, all ribs can be branching ribs.

Alternatively, in at least one embodiment, at least one non-branching rib can be included.

In yet another alternative, in at least one embodiment, half of the ribs can be non-branching ribs and half of the ribs can be branching ribs (e.g. a single branching rib and a single non-branching rib; 2 branching ribs and 2 non-branching ribs (as shown in FIGS. 1A-1I), and so on and so forth.

In at least one embodiment, all ribs can be radially equidistally spaced (as noted and shown in FIGS. 1A-1I)).

In at least one embodiment, a radially non-equidistal distribution between some or all of the ribs is possible.

In at least one embodiment, the branch points may be positioned lower down (i.e. closer to the end portion 119), or higher up (i.e. further away from the end portion 119) on the surface of the barrel portion 106. In this respect, it is noted that when the attachment device 100 is used in conjunction with a closed assay vessel upon release of fluid from attachment device 100 (as hereinafter further illustrated in FIGS. 4A-4D), a portion of attachment device 100 may become submerged in fluids. In general, it is desirable to include branch points 129 sufficiently far upwards on the surface of barrel portion 106 so that when the end portion 119 of the attachment device 100 is inserted into an assay vessel with a penetrable barrier, branch points 129 do not become submerged in fluids present in the assay vessel to facilitate the release of air from the vessel through channels (e.g. channels 109*a*, 109*b*).

In at least one embodiment, the rib branches may be equal in length.

Alternatively, in at least one embodiment, the rib branches may vary in length, either with respect to the branches of one rib, or with respect to branches of different ribs.

In at least one embodiment, more than two branches may extend from a branch point, for example three or four branches.

In at least one embodiment, channels defined by the rib branches (e.g. channel 109*a* defined by rib branch 108*a*1 and 108*a*2), may be partially or completely longitudinally covered thus forming a longitudinally extending tube.

In terms of manufacturing the attachment device 100, in at least one embodiment, the attachment device 100 can be fabricated from a single more or less contiguous material, for example a plastic material. In different embodiments, the plastic material that is used can be a polypropylene; a polystyrene; a polyethylene, including a low and high density polyethylene; a polyethylene terephthalate; a polyethylene terephthalate glycol (PETG); a polyvinyl; a polyvinyl alcohol; a polycarbonate; an acrylonitrile butadiene-styrene (ABS); a polylactic acid; an acetal (also known as a polyoxymethylene, such as for example, sold under the tradename Delrin®); a polyurethane; a polybutylene terephthalate; a polyetheretherketone (PEEK); a polysulfone; a polyphenylene sulfide; a polyetherimide (such as for example sold under the tradename Ultem®); or a nylon (also known as polyamide), for example. In other embodiments the attachment device 100 can be fabricated from a composite material. Such composites include, for example, mixtures of two or more of the aforementioned plastic materials. Composites further may include filler materials, including, carbon fibers, metal particles, glass particles, nanotubes, or wood fibres, for example.

Furthermore, in order to fabricate the attachment device 100, it can be molded or 3D-printed using techniques and methods generally well known to those of skill in the art.

Methods for operating an example of the attachment devices of the present disclosure will now be discussed. In general terms, the methods of the present disclosure can be said to permit a user of the attachment device, notably in conjunction with a fluid dispensing device, to obtain a fluid sample from a fluid source, contain the fluid sample, and transfer the fluid sample to a different location, including to a vessel for assaying the fluid sample, for example. Various embodiments are shown in FIGS. 2A-2B, 3A-3D, 4A-4D, and FIG. 5. Shown in FIG. 5, is a flow chart diagram of an example method 500 of operating an attachment device according to the teachings of the present disclosure. Various acts set forth in the flow chart diagram are further illustrated in accompanying FIGS. 2A-2B, 3A-3D and 4A-4D. It should be noted that method 500, as well as accompanying FIGS. 2A-2B, 3A-3D and 4A-4D, refer to the attachment device 100 shown in FIGS. 1A-1I for ease of illustration only, but method 500 can be used in conjunction with different embodiments of the attachment device.

At act 502 in FIG. 5, an attachment device is coupled to a fluid dispensing device to thereby form a fluid dispensing assembly 250. An example of act 502 is shown in FIGS. 2A-2B. Fluid dispensing device 200, comprising a body, defining a fluid reservoir 205, and a plunger 210 inserted at an upper end of the fluid reservoir 205 therein can be coupled to attachment device 100, by moving the bottom of the fluid dispensing device 200 towards the upper end of the attachment device 100 (arrow m1), and slideably inserting distal portion 215 of dispensing device 200 into matching opening 114 of collar portion 104 of attachment device 100. In general, the geometries of the tapering of the outer surface of distal portion 215 and the inner surface of collar portion 104 can be tightly matched so that when sufficient force is used attachment device 100 can become attached by a friction coupling to dispensing device 200. Upon insertion, dispensing device 200 and attachment device 100 together form the fluid dispensing assembly 250 (FIG. 2B). It is noted that a reverse act may be performed to separate attachment device 100 and dispensing device 200 from one another so that they are two separate elements again (not shown). Thus, attachment device 100 can be said to be releasably attached to dispensing device 200. It is further noted that in different embodiments, different couplings may be used. Thus, for example, in at least one embodiment, attachment device 100 can be coupled to dispensing device 200 solely by friction coupling. This can be achieved generally be applying sufficient force in general longitudinal direction between the inner surface of collar portion 104 and the outer surface of the bottom portion of dispensing device 200 to establish a sealed coupling between attachment device 100 and dispensing device 200. These couplings may be referred to as 'slip tip' couplings. In other embodiments additional coupling portions may be included in either attachment device 100 or dispensing device 200, or both devices. Thus, for example, the inner surface of collar portion 104 and the outer surface of distal portion 215 may each comprise threaded portions that are matched to one another, so that the dispensing device 200 and attachment device 100 can be coupled by performing a rotational or screwing action. In other embodiments, clips may be included to secure attachment of attachment device 100 to dispensing device 200. In yet further example embodiments, Luer-lock syringe couplings can be used to achieve coupling between attachment device 100 and dispensing device 200.

At act 504 in FIG. 5, fluid is collected in the fluid collection assembly. An example of act 502 is shown in FIGS. 3A-3D. Shown in FIG. 3A is fluid collection assembly 250 in a first state of act 504 together with fluid source 300 comprising container 310 containing fluid 305. It is noted that fluid 305 can be any fluid, including any aqueous fluid (e.g. water) or non-aqueous fluid (e.g. an organic fluid, such as oil, or an organic solvent) and container 310 can be any container capable of receiving end portion of attachment device 100, including any man made container. Fluid source 300 can also be a natural fluid source, such as is the case when a pond or lake are employed as a fluid source, for example.

As shown in FIG. 3A, fluid collection assembly 250 can be moved towards surface 315 of fluid 305 (see: arrow m2) and attachment device 100 can penetrate fluid surface 315 to be inserted into fluid 305 (a second state of act 504 of fluid collection assembly 250; see: FIG. 3B), at least sufficiently deep so that openings 110*a* and 110*b* (not separately visible) are submerged in fluid 305. Thereafter plunger 210 can be moved upwards relative to fluid reservoir 205 (see: arrow m3). The upward moving action of plunger 210 causes the aspiration of fluid 305 through openings 110*a* and 110*b* into hollow interior 102 (not visible) of attachment device 100, and further upwards into fluid reservoir 205, as illustrated by a third state of act 504 of fluid collection assembly 250 shown in FIG. 3C. It is noted that in some embodiments, smaller volumes of fluid 300 can be required, and fluid dispensing devices can be used which only fill hollow interior 102 of attachment device (or a portion thereof), and in such embodiment, fluid would not enter a fluid reservoir of a fluid dispensing device.

Upon collection of fluid 305 into fluid collection assembly 250, fluid dispensing assembly 250 can be removed from fluid source 300 (see: arrow m4), and a fluid sample 320 of fluid 305 can be said to be collected and contained in fluid dispensing assembly 250 (a fourth state of act 504 of fluid collection assembly 250; see: FIG. 3D). Fluid collection assembly 250 containing fluid sample 320 may now be used to transfer fluid sample 320 elsewhere, including, for example, to an assay vessel or any other desirable fluid container.

At act 506 in FIG. 5, the fluid dispensing assembly 250 is engaged with an assay vessel, notably an assay vessel containing a penetrable barrier. An example of act 506 is shown in FIGS. 4A-4B. Shown in FIG. 4A is fluid dispensing assembly 250 in a first state of act 506 (substantially the same as the fourth state of act 504 shown in FIG. 3D), together with assay vessel 400 comprising assay housing 410 covered by penetrable barrier 405. Assay vessel 400 further contains assay reagent 415. Fluid dispensing assembly 250 can be moved towards assay vessel 400 (see: arrow m5) with sufficient force to allow exterior distal surface 118*a* (not separately visible) of closed distal end 118 to contact penetrable barrier 405 and penetrate barrier 405 so that attachment device 100 is received by assay vessel 400 (a second state of act 506 of fluid dispensing assembly 250; see: FIG. 4B). The barrier material used to cover assay vessel 400 can vary. As noted, the barrier 405 is penetrable by closed distal end 118, and the barrier 405 can, for example, be fabricated from a substantially non-tearable material, such as a rubber or a silicone. It is noted that due to the position of side openings 110*a*, 110*b* (not separately visible) within attachment device 100, side openings 110*a*, 110*b* do not become blocked by material of penetrable barrier 405 as attachment device 100 penetrates barrier 405 since the closed portion of the bottom of the distal end 118 makes contact first with the barrier 405. Similarly, side openings 110*a*, 110*b* do not become blocked by crystalline or particulate assay reagent 415 present in assay vessel 400, as such assay reagent 415 may contact attachment device 100 upon insertion into assay vessel 400, including contact resulting from release of fluid 305 into assay vessel 400, as hereinafter described, and possible resulting movement of assay reagent 415 within assay vessel 400 due to the release of the fluid 305 into assay vessel 400.

At act 508 in FIG. 5, fluid is released from the fluid dispensing assembly 250. An example of act 508 is shown in FIGS. 4C-4D. Shown in FIG. 4C is fluid dispensing assembly 250 in a first portion of act 508, being received within assay vessel 400 after the end portion 118 penetrates covered by penetrable barrier 405. It is noted that in this state portions 116 flaring out from ribs 108*a*, 108*b*, 108*c*, 108*d* (not separately marked in FIG. 4C) block further entry of attachment device 100 into assay vessel 400. By the exertion of downward pressure on plunger 210, relative to fluid reservoir 205, plunger 210 moves downward (see: arrow m7). Such movement results in the expulsion of fluid 305 from fluid reservoir 205 through hollow interior 202 (not visible) and openings 110*a* and 110*b* (not separately visible) into assay vessel 400. It is noted that during use despite the fact that a closed assay vessel 400 is used and fluid 305 is introduced into assay vessel 400, the pressure in the assay vessel 400 does not increase substantially. The reason that this is the case is that concomitantly with the release of fluid 305 from side openings 110*a* and 110*b*, air present in assay vessel 400 can escape upwards from the assay vessel 400 to the exterior, around the assay vessel and the dispensing assembly 250, through channels 109*a* and 109*b*, as well as through channels 111*a*, 111*b*, 111*c* and 111*d*. It is noted that in this regard, it is particularly desirable for branch points 129 to be positioned sufficiently high upwards on the surface of barrel portion 106 so that they do not become submerged in fluid 305 and/or assay reagent, so that, in turn channels 109*a* and 109*b* remain free of fluids, since fluids may otherwise enter channels 109*a* and 109*b* through capillary action, if not for the flared portion 116, and instead the channels 109*a* and 109*b* allow for the escape of air therethrough. Thus, it is possible to not substantially increase the pressure in assay vessel 400, and prevent interference as a result thereof with the subsequent assay. Finally, it should be noted in FIGS. 4C and 4D that fluid 305 contacts assay reagent 415 and can react with assay reagent 415.

Upon completion of downward movement of plunger 210, all or substantially all of fluid 305 constituting sample 320 can be transferred from fluid dispensing assembly 250 into assay vessel 400 (a second portion of act 508 of fluid dispensing assembly 250; see: FIG. 4D). Fluid dispensing assembly 250 may now be removed from assay vessel 400 and attachment device 100 may optionally be separated from fluid dispensing device 200 (not shown).

At act 510 in FIG. 5, assay vessel 400 can be used to detect a fluid parameter in fluid sample 320. The fluid parameter may be selected as desired and can for example be a chemical parameter, for example, that indicates whether a particular chemical species is present in fluid sample 320. Thus, by way of example only, fluid sample 320 can be a water sample, and the presence, for example, of metal ions in the water sample can be tested when a reagent capable of forming a coloured complex in the presence of metal ions is included in assay vessel 400, and the coloured complex can, for example, be detected spectrophotometrically, or by the naked eye. The assays and assay methods may be varied and include, for example, voltammetric assays, including voltammetric assays such as described in PCT Patent Application PCT/CA2020/050022, previously filed by the applicant of the instant application. It will be clear to those of skill in the art that the attachment device of the present disclosure in accordance with the teachings herein may be used in conjunction with many different assays, and that assays may be selected and performed, as desired.

As can now be appreciated, the attachment devices of the present disclosure can be used to releasably attach to a fluid dispensing device. When an attachment device is attached to a fluid dispensing device, the resulting assembly can be used to obtain a fluid sample from a fluid source, and a portion or all of the fluid sample can later be dispensed. The attachment devices are particularly suitable to be used in conjunction with an assay vessel closed by a barrier that can be penetrated by the attachment device, so that a fluid can be assayed in the assay vessel. In this manner the attachment devices of the present disclosure can be used to assay the quality of various fluid samples, such as water samples, or fluid based mixtures or formulations, for example, medicinal formulations or beverages, for example.

Of course, the above described example embodiments of the present disclosure are intended to be illustrative only and in no way limiting. The described embodiments are susceptible to many modifications of composition, details and order of operation. The claimed subject matter, rather, is intended to encompass all such modifications within its scope, as defined by the claims, which should be given a broad interpretation consistent with the description as a whole.

The invention claimed is:

1. An attachment device for releasable coupling to a fluid dispensing device, the attachment device comprising:

a hollow body having a proximal collar portion with an opening at its proximal end to releasably couple the attachment device to the fluid dispensing device, the collar portion encircling and extending downwards from the proximal opening, and a barrel portion longitudinally tapering downwards from the collar portion towards a distal end portion of the barrel portion, the distal end portion having a closed end and at least one side opening disposed above the closed end, the at least one side opening allowing for aspirating fluid into and dispensing fluid from the hollow body, and the hollow body further having an outer surface with at least one rib extending longitudinally along an outer surface of the barrel portion and branching at a branch point upwards into at least two rib branches to form a channel between the rib branches.

2. The attachment device according to claim 1, wherein, the branch point is positioned at a position on the outer surface of the barrel portion so that when the attachment device is inserted into an assay vessel, the branch point is not submerged in fluid present in the assay vessel.

3. The attachment device according to claim 1, wherein the attachment device comprises additional ribs extending longitudinally along the outer surface of the barrel portion, with at least one of the additional ribs branching upwards into at least two rib branches to form a channel between the rib branches.

4. The attachment device according to claim 1, wherein the attachment device comprises additional ribs extending longitudinally along the outer surface of the barrel portion, each of the ribs branching upwards into at least two rib branches to form channels between the additional rib branches.

5. The attachment device according to claim 1, wherein the attachment device comprises at least three additional ribs extending longitudinally along the outer surface of the barrel portion, the ribs further forming at least four additional channels between the ribs.

6. The attachment device according to claim 1, wherein the attachment device comprises four ribs, each rib extending longitudinally along the outer surface of the barrel portion, wherein two of the four ribs branch upwards into two rib branches to form two channels between the rib branches and wherein another two of the four ribs are unbranched, the four ribs further forming four additional channels between the ribs.

7. The attachment device according to claim 6, wherein the two unbranched ribs are positioned on first opposite sides of the barrel portion, and at least two of the rib branches are positioned on second opposite sides of the barrel portion.

8. The attachment device according to claim 1, wherein the attachment device comprises additional ribs extending longitudinally along the outer surface of the barrel portion, wherein all of the additional ribs branch upwards into two rib branches to form two channels between the rib branches, the additional ribs further forming a plurality of additional channels between the additional ribs.

9. The attachment device according to claim 2, the outer surface of the hollow body further having at least two ribs wherein ribs of the at least two ribs are radially equally spaced apart.

10. The attachment device according to claim 2, wherein one or more of the at least one rib extend upwards from a first point on the outer surface of the barrel portion above the end portion to a second point on the outer surface of the collar portion.

11. The attachment device according to claim 2, wherein one or more of the at least one rib includes an outward flaring portion which during use upon contact between the outward flaring portion and a barrier of an assay vessel covered by the barrier, the output flaring portion stops further entry of the attachment device into the assay vessel covered by the barrier.

12. The attachment device according to claim 11, wherein the radially outward flaring portion is on at least one of the branches of the at least one rib.

13. The attachment device according to claim 1, wherein the end portion of the attachment device includes at least two side openings.

14. The attachment device according to claim 13, wherein two side openings of the at least two side openings are positioned at opposite sides of the barrel portion.

15. The attachment device according to claim 1, wherein an exterior surface of the closed end represents a portion of the circumference of an imaginary sphere that has a diameter of from about 0.5 mm to about 5 mm.

16. The attachment device according to claim 1, wherein the distal end portion is sufficiently pointed to penetrate a barrier of an assay vessel and insufficiently pointed to rupture human skin upon accidental contact between the pointed distal end portion and human skin.

17. A method of assembling a fluid dispensing assembly, the method comprising: obtaining the fluid dispensing device; and obtaining the attachment device for releasable attachment to the fluid dispensing device being defined according to claim 1.

18. A method for detecting a fluid parameter in a fluid sample, the method comprising:

obtaining a fluid dispensing assembly comprising a fluid dispensing device that is releasably attached to an attachment device, the attachment device being defined according to claim 1;

aspirating a fluid comprising a fluid parameter from a fluid source through the at least one side opening into the hollow body of the attachment device to thereby obtain a fluid sample contained in the attachment device;

moving the closed pointed distal end portion of the attachment device with sufficient force to penetrate a barrier covering an assay vessel to thereby fluidically connect the hollow body of the attachment device and an interior of the assay vessel, the assay vessel comprising one or more reagents for the detection of the fluid parameter; and dispensing the fluid sample from the attachment device into the assay vessel to allow detection of the fluid parameter.

19. A fluid dispensing assembly comprising a fluid dispensing device having a fluid reservoir, the fluid dispensing device being releasably attachable to an attachment device, the attachment device being defined according to claim 1.

20. An assembly for the detection of a fluid parameter in a fluid sample, the assembly comprising: a fluid dispensing device having a fluid reservoir, the fluid dispensing reservoir being releasably attachable to an attachment device, the attachment device being defined according to claim 1, and an assay vessel capable of receiving the distal end portion of the attachment device.

* * * * *